UNITED STATES PATENT OFFICE.

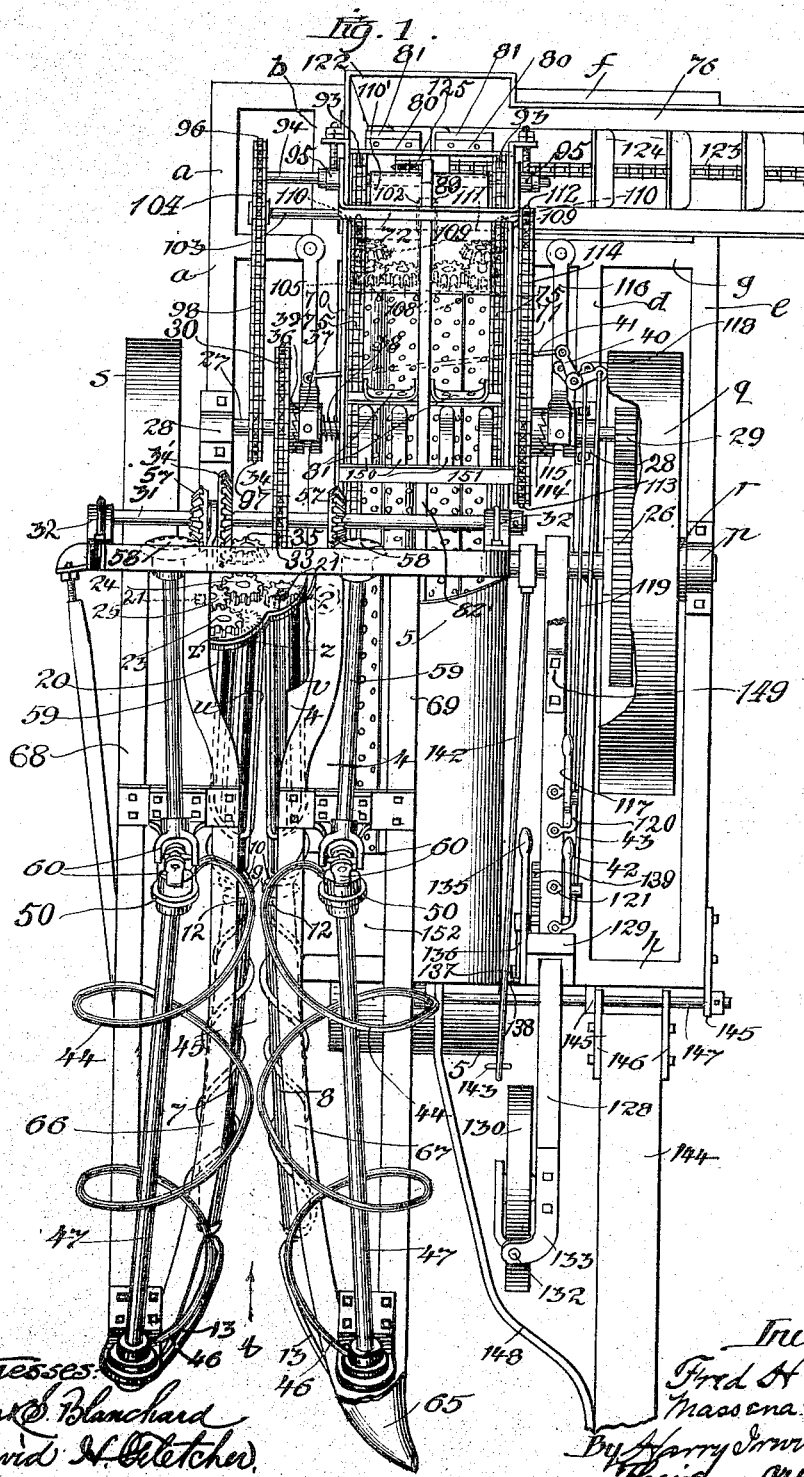

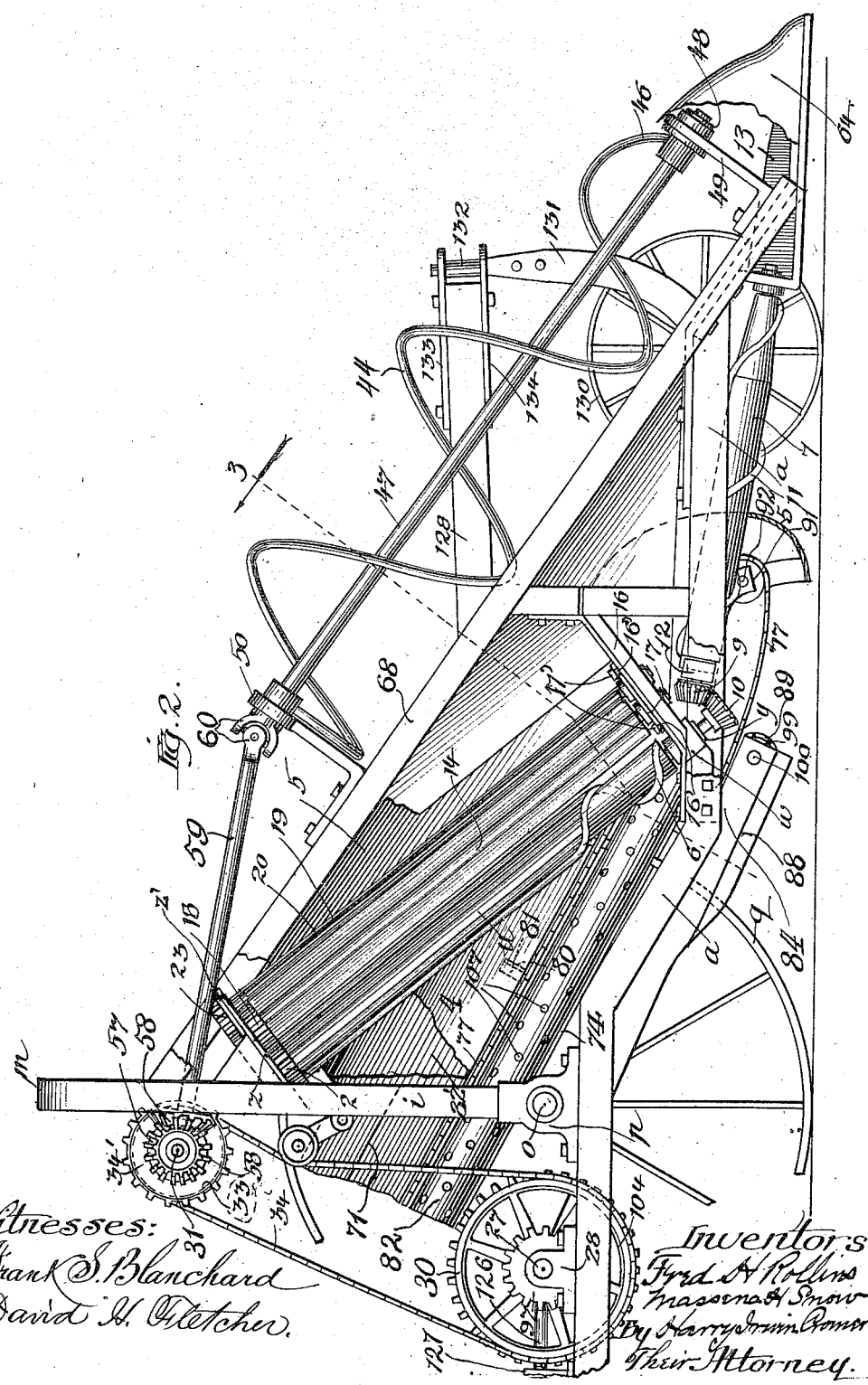

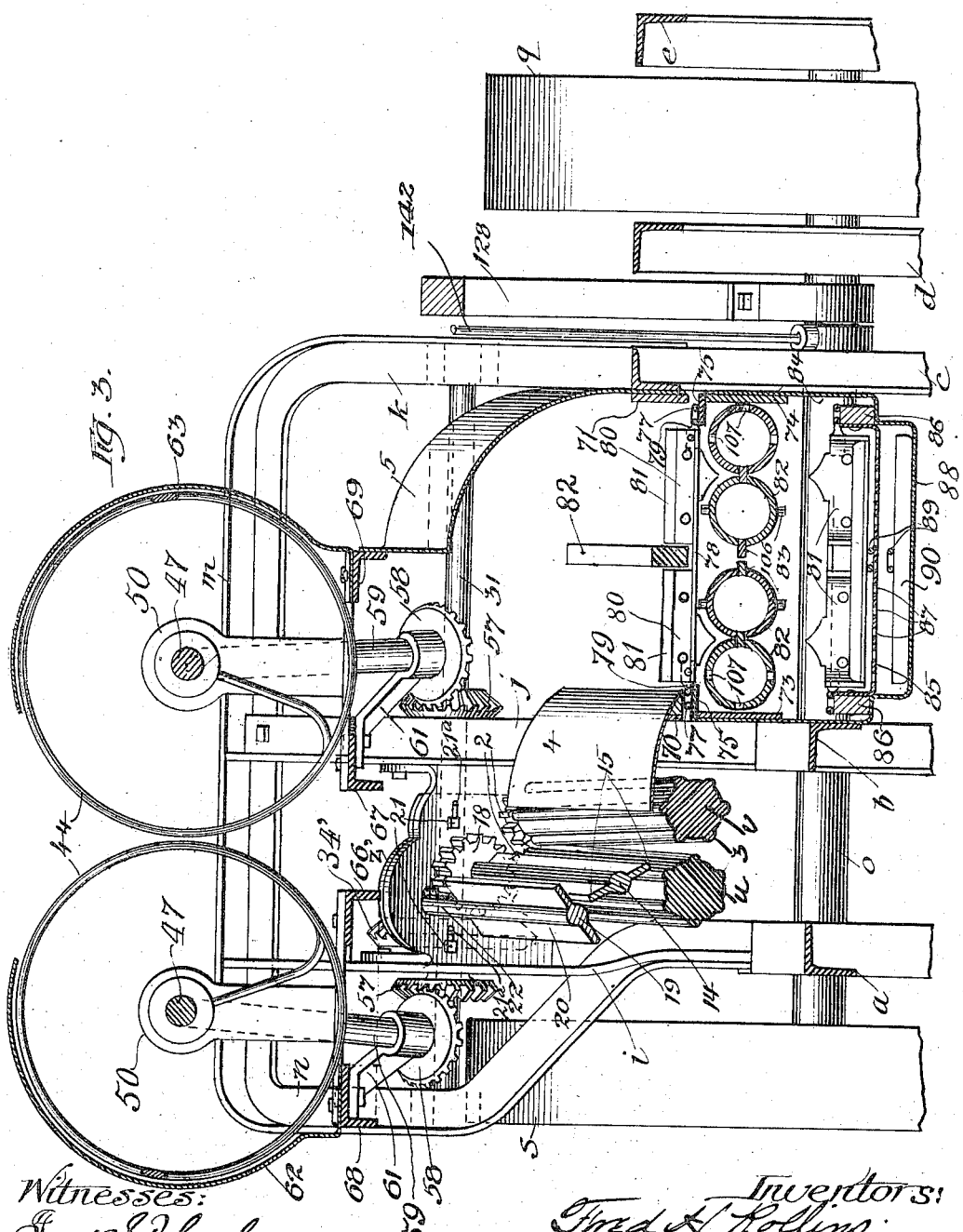

FRED H. ROLLINS, OF KIRKLAND, AND MASSENA H. SNOW, OF BLACKBERRY TOWNSHIP, KANE COUNTY, ILLINOIS.

CORN-HARVESTING MACHINE.

1,049,401.     Specification of Letters Patent.     Patented Jan. 7, 1913.

Application filed April 8, 1911. Serial No. 619,738.

*To all whom it may concern:*

Be it known that we, FRED H. ROLLINS, residing in Kirkland, in the county of De-kalb and State of Illinois, and MASSENA H. SNOW, residing in Blackberry township, Kane county, Illinois, both citizens of the United States, have jointly invented certain new and useful Improvements in Corn-Harvesting Machines, of which the following is a specification.

This invention relates to that class of corn harvesting machines which are adapted to be used for removing the ears of corn from the stalks, and for carrying or husking and conveying the ears into a suitable receptacle.

The principal object of the invention is to provide a simple, economical and efficient corn harvesting or picking, or picking and husking machine.

A further object is to provide a corn harvesting or picking machine having gripping or feed rolls and rotary beater mechanism so constructed and arranged as to reduce to a minimum or prevent the winding of fibrous material about such rotary members, and to provide in a machine comprising such feed rolls and rotary beater mechanism means for raising and supporting stalks and ears of corn to be operated upon in such a manner as to reduce to a minimum or prevent the breaking of bent or partially broken stalks, and prevent the loss of or injury to ears of corn on such bent over or other corn stalks; to cause the stalks to pass between the feed rolls, and the ears to be removed from the stalks before coming into contact with the feed rolls or becoming crushed or partially shelled or injured by the latter; to provide simple and efficient means for catching ears of corn which fall or are removed from the stalks, or which fall with parts of broken stalks, and prevent such ears from falling to the ground and feed such picked or fallen ears into position to be thrown into the proper receptacle, conveyer or husking mechanism, all without the use of finger chains or feed chains, and in such a manner as to prevent unnecessary loss, shelling or injury to the ears; to accomplish all of these purposes by means of feeding and corn-supporting mechanism of simple construction adapted to be operated with less expenditure of power and cost of operation than a machine having feeding mechanism comprising finger chains and gears and sprocket chains would require; to provide feeding and corn supporting mechanism adapted to enable the stalks and the corn supported thereby—and particularly the bent over and partially broken stalks and the corn thereon—to be raised without being subjected to a sudden shock such as is produced by feed chain fingers traveling around sprocket wheels into contact with the stalks at a necessarily greater speed than such fingers move along the relatively straight portions or laps of the feed chains, and which shock tends to break the stalks and dislodge the corn thereon before the same can be properly operated upon by the beater mechanism or gripping rolls; to provide feeding and corn supporting mechanism adapted to raise bent-over stalks and the corn thereon at first gradually and with a gradually increasing speed or upward movement of the stalks, and to feed the stalks and corn into position to be operated upon by the beater mechanism, and to support the corn after being picked or removed from the stalks in such a manner that such ears as are not at once thrown onto the conveyer by the beater mechanism, will be fed upward and rearward into position to be knocked into the conveyer or husker by the rotary beater mechanism; to provide conveyer or husking and elevator mechanism adapted to receive and husk or convey corn thrown directly onto the husking rolls by the picking or beater mechanism, and to provide simple and efficient means for operating the feed rolls, the rotary beater mechanism, the forward feeding and corn supporting mechanism, and the conveyer or conveyer and husking mechanism adapted to operate all of the parts with the minimum expenditure of power and reduce side draft, weight of the machine as a whole, and loss of power by friction or other causes to a minimum, and to enable a machine having these advantages to operate upon a row or rows of corn not straddled by the team which draws the machine.

Other and further objects of the invention will appear from an examination of the drawings and the following description and claims.

The invention consists in the features, combination and details of construction herein described and claimed.

In the accompanying drawings Figure 1 is a plan view of a corn harvester or picking and husking machine constructed in accordance with our improvements, with part of the main traction wheel broken away, and parts—such as the seat, etc., omitted; Fig. 2, an enlarged view in side elevation of the forward portion of the machine shown in Fig. 1, and including our improved stalk raising, feeding and picking mechanism and a portion of the conveyer, or elevator mechanism and husking mechanism; and Fig. 3, an enlarged detail view in cross section, taken on line 3 of Fig. 2, looking in the direction of the arrow, and showing the gripping or main feed rolls, the inclined feeding spirals or worms, the husking rolls, the conveyer or elevator for the ears of corn, and the screen or shelled corn conveyer, all in cross section.

In constructing a corn harvesting machine, or corn picking and husking machine in accordance with our invention or improvements we provide a main frame comprising longitudinally extending bottom-frame members $a$, $b$, $c$, $d$, and $e$, transverse bottom-frame members $f$, $g$, and $h$, and uprights $i$, $j$ and $k$ connected by a transverse top portion or frame member $m$, and forming an upright frame portion which is provided at one side with a lateral projection $n$.

The main frame is supported upon an axle $o$ which is journaled in suitable bearings $p$, $p$, preferably at the bottom of the upright frame portion above described. A main supporting and traction wheel $q$ having a hub $r$ forms a support for one end of the axle, and a supporting wheel $s$ is mounted upon and forms a support for the opposite end of the axle. These wheels and axle support the frame in such a manner as to properly balance it and permit the main frame to be tipped or tilted to different angles of inclination as desired. The forwardly projecting bottom frame portions $a$ and $b$ have their forward ends depressed or located below the level of the main bottom frame of which they form a part and are a sufficient distance apart to provide a passage $t$ therebetween adapted to permit said frame portions to pass on opposite sides of any row of corn to be operated upon, or in other words, adapted to permit the stalks of standing corn or corn to be operated upon to pass between said forwardly projecting frame portions which extend forward from the axle and diverge at their front ends and form supports for the picking mechanism including the gripping or feed rolls, the rotary beater mechanism, the inclined feeding spirals or worms, the shield, and the heliced or spirally ribbed bottom grain-supporting feed rolls hereinafter described.

Mounted upon opposite sides of the passage $t$ formed between the forwardly projecting and transversely yielding or flexible frame portions $a$ and $b$ and extending upward and rearward at an incline are a pair of gripping or main feed rolls $u$ and $v$, the first mentioned roll being secured at its lower end to the frame portion $a$ by means of a suitable bearing member or bracket $w$ which is provided with a bearing sleeve or boxing $y$ through which the bottom journal of said roll extends, (as shown in Fig. 2) and the roll $v$ being mounted in the same manner or similarly upon the frame member $b$. The upper ends of these gripping or feed rolls are journaled in suitable bearings in an upper inclined plate or bracket $z$ and are each provided with a spur gear or pinion 2 in toothed engagement with each other and fixed to said gripping rolls respectively, as shown in Fig. 3. The main body portions of each of these gripping rolls is provided with a series of laterally projecting ribs 3 and are so mounted that they converge toward their upper ends and diverge at their lower ends sufficiently to leave a space therebetween adapted to permit corn stalks to pass between said rolls and to be gripped between the ribbed portions thereof. Mounted in front of the roll $v$ is an outwardly and downwardly inclined plate or shield 4, the inner or forward upper edge of which is directly in front of said roll and extends throughout substantially the entire length of the latter at substantially the same incline and in position to prevent the ears of corn from coming into contact with the roll $v$. This plate or shield forms one side of the lower portion of the conveyer or elevator and husking device hereinafter described, and the opposite or outer side of which elevator is formed by a curved casing portion 5, shown in Figs. 1, 2 and 3. The lower end of each of the rolls $u$ and $v$ respectively, is provided with a spiral or helical rib or ribs 6 as shown in Fig. 2, for feeding the stalks upward and rearward.

Bottom heliced or spirally ribbed feeding and grain-supporting rolls 7 and 8 are connected at their rear ends with the bottom ends of the gripping rolls $u$ and $v$ respectively by means of beveled gears or pinions 9 fixed to said bottom rolls and beveled pinions 10 fixed to the bottom ends of said gripping or main inclined feed rolls $u$ and $v$, respectively. These bottom rolls 7 and 8 are each provided with a helical or spiral rib 11 which is so disposed as to feed the stalks and corn rearward as said rolls are rotated by means of the gripping rolls and the mechanism for operating the latter, and are supported at their opposite ends by means of journal bearings or brackets 12 and 13, the forward brackets 13 being curved outward and forward on opposite sides of the passage *t* so as to form fenders or guards for guiding the stalks between the forward ends of the bottom rolls 7 and 8, which are at an angle with respect to the gripping rolls *u* and *v* with which they are connected.

Mounted in front of and over the gripping roll *u* and preferably extending upward and rearward at the same incline or parallel with said gripping rolls is a rotary beater 14 having laterally projecting beater blades 15 which rotate upward and forward in front of or over the passage or space between the gripping rolls and in a direction opposite to the direction of rotation of the gripping roll *u* in front of which such rotary beater is mounted. This rotary beater is mounted at its lower end on a suitable supporting bracket or bearing member 16 (shown in Fig. 2) in an adjustable supporting plate or boxing 17. The adjustable bearing plate 17 is secured to the inclined frame member or bracket 16 by means of bolts 17' which extend through laterally elongated slots 16' in the plate, adapted to permit the latter and the lower ends of the beaters supported thereby to be adjusted to different positions transversely of the frame and with respect to the gripping rolls. The rotary beater 14 is provided at its upper end with a spur gear 18 in fixed relation thereto and in toothed engagement with the spur gear 2 on the roll *u*, (see Fig. 3,) and its upper end is journaled in a transversely adjustable bearing plate *z'* having bolts 21 thereon extending through transversely elongated slots 21ª in the plate *z*. A similar rotary beater 19 having laterally projecting beater blades 20 is mounted at an incline in front of and in position to extend upward and rearward over the beater 14, and is journaled at its bottom end in the transversely adjustable plate 17, and at its upper end, in the plate *z'*. (See Figs. 2 and 3.) The beater 19 has at its upper end a shank 22 which extends through the plates *z* and *z'* and on which is fixed a spur pinion 23 above the bearing plate *z'*. A similar spur pinion 24 is fixed to the upper end of the beater 14 and above the plate *z'*, and a toothed idler 25 is mounted on the upper side of the plate *z'* and in toothed engagement with the pinions 23 and 24, as shown in Fig. 1. Both rotary beaters are thus adjustable transversely at top and bottom, and are connected in such a manner that they will rotate in the same direction with each other but opposite to the direction of rotation of the gripping roll *u*. These beaters are so disposed and connected that their laterally projecting blades extend substantially at right angles, and the blades of said beaters respectively are adapted to interlap or overlap in such a manner as to clean each other and alternately move inward and upward adjacent to the passage *t*, and to pass each other while rotating in the same direction, as indicated in Fig. 3. I prefer to so arrange the beaters that the inner upwardly and forwardly moving edge of the upper beater is directly over and in front of the central portion of the beater 14 and center of the gripping roll *u*, said upper beater being a greater distance from the inner adjacent sides of the gripping rolls and the center of the passage between said rolls than is the lower beater.

In order to provide suitable and efficient means for operating the feed rolls and beater mechanism above described, and for operating the other parts of the machine hereinafter described, the main traction wheel *q* is provided with a spur wheel 26 fixed to the hub and preferably inside of the rim of said traction wheel, as shown in Fig. 1. A main driving shaft 27, mounted in suitable journal bearings 28 in the main frame, is provided with a spur pinion 29 in toothed engagement with the gear 26, and with a sprocket wheel 30. A counter shaft 31 is journaled in suitable bearings 32 in the upper part of the main frame and is provided with a sprocket 33 fixed thereon and connected with the main driving shaft 27 by means of a sprocket chain 34 in engagement with the teeth of said sprockets 30 and 33 respectively. A bevel gear wheel 34' is mounted upon and in fixed relation to the counter shaft 31, and a bevel pinion 35 is mounted upon the upper end of the gripping or feed roll *u* above the bracket or plate *z* and in toothed engagement with said bevel gear wheel 34'. The sprocket wheel 30 on the shaft 27 is provided with a clutch member 36; and a movable clutch member 37, mounted slidably upon the shaft 27 and adapted to be operated in one direction by a compressible spring 38, is movable into and out of clutching engagement with the clutch member 36, whereby the picking mechanism including the gripping rolls and beaters above described are adapted to be connected with and disconnected from the main traction wheel or source of power, as desired. The slidable clutch member 37 is provided with an operating lever 39 in operative engagement therewith and pivotally mounted on the main frame, the lever 39 being connected with a bell-crank lever 40 by means of a connecting rod 41, said bell-crank lever being pivoted on the main frame and connected with a hand lever 42 by means of a connecting rod 43.

By the above arrangement it will be seen that, as the machine is pulled or driven forward with the frame portions *a* and *b* and the rolls supported thereby on opposite sides of the row of corn to be operated upon, the gripping rolls will be caused to rotate in opposite directions in such a manner that their adjacent peripheries and peripheral ribs will move inward and rearward so as to grip the stalks of corn and pull them rearward and somewhat downward, and the rotary beaters will both be rotated in the same direction but in a direction opposite to the direction of rotation of the gripping roll $u$ in front of and over which they are located, their laterally projecting blades moving forward and upward on the inner side of said beaters or on the side nearest to and preferably extending across the center of the passage $t$ between the gripping rolls, thus being adapted to strike the ears of corn and knock them off the stalks and over the inclined and curved shield or fender 4 and directly onto the husking rolls and into the conveyer or elevator hereinafter described, and before the ears are permitted to come into contact with the gripping rolls, thus preventing the ears from being crushed or shelled or in any way injured by the gripping rolls. The upper rotary beater blades prevent the stalks and fibrous material from winding around the beater 14, and the latter prevents them from winding around the upper beater, and the blades of the beaters respectively, move alternately into position to strike the ears. The bottom spirally ribbed feeding and corn supporting rolls are in such position on opposite sides of the row of corn that the stalks of standing corn prevent the ears which drop down upon said bottom rolls from passing therebetween to the ground, and the rotation of said bottom rolls causes the ears to be fed backward and upward toward the gripping rolls and rotary beaters and into position to be struck by the latter and thrown over the shield or guard board 4, which forms a lower portion of one side wall or casing of the conveyer, and into the conveyer and husking mechanism hereinafter described.

A pair of spirals or feeding and raising worms 44 are mounted at an incline on opposite sides of the passage $t$, forward of and over the rolls $u$ $v$, 7 and 8, and rotary beaters 14 and 19, and extend upward and rearward from the forward ends of the shoes, prongs, or forked frame portions $a$ and $b$ with their helical ribs or upwardly and rearwardly feeding and lifting spirals in such positions with respect to each other that they meet at or near the center of the passage $t$ or come sufficiently close together at or near the center of said passage to prevent corn or corn stalks from passing between the contacting or nearest adjacent portions of the respective whirls, turns or volutions of the spirals or helical ribs,—or so close together as to form pockets 45 between the respective turns or volutions of the adjacent spirals, the walls of which pockets, being formed by the turns of the spirals, cause the pockets thus formed by and between the spirals and in which the stalks of corn are caught to move upward and rearward with respect to the frame of the machine and toward the rotary beaters and main feed or gripping rolls, thus raising and feeding the stalks and ears of corn rearward and upward in front of and into position to be operated on by the bottom rolls, the main feed or gripping rolls and the rotary beaters while the stalks are between and engaged by the spirals. The spirals or worms are, by preference, each tapered, being smaller at their lower forward ends than at their central portions, so that they form a tapered passage at and between their lower end portions adapted to cause the corn stalks to be gathered together or somewhat compressed as the tapered or forward portions of the spirals or worms pass on opposite sides of the row or stalks. These tapered portions 46 of the lower forward ends of the spirals or worms extend rearward and away from the axial centers of the worms respectively, and the worm on the right hand side of the passage or row as the machine moves forward is right-handed and the worm on the left hand side of the row and passage is left-handed, and the worm on the right hand side is rotated in the right-hand direction or in the direction of the movement of the hands of a watch, and the one on the left is rotated in the opposite direction by means of the operating mechanism hereinafter more particularly described, the inner tapered forward portions of the worms or helical ribs thus move upward as the worms are rotated so that the stalks of corn are first engaged by a portion or portions of the worms nearest the axial centers of the worms and which therefore move upward more slowly than the portions of the worms farther back and farther from the axial centers of the worms. The stalks are thus first engaged by the forward tapered portions of the helical ribs or turns of the worm and raised at first gradually and with a gradually increasing speed of movement as the portions of the spirals farther from the axial center come successively into contact with the stalks or ears, the turns or volutions of the worms being at such a pitch and the revolutions at such a speed that the rearward movement or feed of the worms will correspond with the forward speed of the machine, and the upward feed or movement of the corn will be at first relatively slow and gradually increase in speed so as to avoid and prevent so far as possible any sudden jerking of the stalks and all shocks which would tend to break the stalks or prematurely dislodge the ears of corn, especially the bent-over stalks and the ears thereon, as already suggested. The frequent breaking of the stalks caused by the relatively rapid movement of the fingers of feed chains as they pass around forward sprocket wheels at a greater speed than during their travel in a straight path of movement along the opposite sides of the row or stalks engaged by the straight parts of the chains is thus avoided, and the corn is raised gradually and fed rearward toward the beaters and rolls without injury.

The worms may be provided with shafts 47 extending longitudinally thereof and forming a support therefor, and their axial centers may diverge outward and forward, as indicated in Fig. 1, and the forward ends of the respective worms or helixes, or the supporting shaft upon which they are mounted, are journaled in suitable bearings 48 in supporting brackets or frame members 49—the upper rear ends of said helixes or the shafts aforesaid, being journaled in suitable bearings 50.

The worms, helixes or feeding spirals 44 are each operatively connected with the counter shaft 31 and thereby with the source of power by means of bevel gear wheels or pinions 57 fixed to said shaft 31, similar bevel gear wheels 58 in toothed engagement with the gear wheels 57, and suitable means for connecting the gear wheels 58 with the respective worms 44 or the shafts 47, which last mentioned connecting means consists, by preference, of stub shafts 59 connected with the shafts 47 respectively by means of universal joints 60 and journaled in suitable bearings or bearing brackets 61, the gear wheels 58 being mounted on said stub shafts 59 respectively, which stub shafts thus form rearwardly and upwardly extending portions of flexible shafts or flexibly connected shafts comprising forward portions or members 47 and rear portions or members 59. The flexible connections enable the spirals 44 or the forward shaft members 47 to be connected directly with the shaft 31 by means of a single pair of gear wheels for each worm and in such a manner as to enable the worms to extend at the desired incline without mounting the shaft 31 higher or farther back from the end of the rolls $u$ and $v$ than is desirable. This is avoided and the rolls, beaters, and worms are supported at the desired inclines and in the desired relative positions by the use of the flexible shaft mechanism instead of mounting the bevel gears 58 directly on the ends of the worms 44 or shafts 47. Inclined guiding frame members 66 and 67 are mounted on opposite sides of the passage $t$ and in front of the gripping rolls and beaters and between said rolls and beaters and the respective worms, and are secured at their lower ends to the respective frame members $a$ and $b$, and at their upper ends to the main frame, between inclined braces 68 and 69 of similar construction and arrangement. Shields or casings 62 and 63 are mounted on the braces 68 and 69 and cover the outer portions of the worms 44, and form tapered noses 64, 65.

An inclined elevator and husker frame is provided which comprises inclined side boards or elevator side frame portions 70 and 71 connected at their upper ends by means of a metallic brace 72 and secured firmly in the main frame in any desired manner.

Metallic bottom side-frame members 73 and 74, beneath the inclined side frame members 70 and 71, respectively, form supports for tracks 75 which extend upward and rearward at an incline from points adjacent to the bottom ends of the gripping rolls and rotary beaters above described, to a point over the discharge elevator 76, or other receptacle for receiving the corn after it has been operated upon. (See Fig. 3.) On these tracks 75 are mounted the upper laps of elevator or conveyer chains 77 which support transverse angle irons or cross strips 78 which are secured at their opposite ends to said conveyer chains 77 by means of bosses or lugs 79 projecting laterally on the inner sides of the links of the chains and riveted to the upwardly extending flange portions 80 of said strips 78. The upwardly extending portions of the strips 78 form blades or buckets for carrying the corn upward and are provided with extensions or curved bucket portions 81 riveted thereto as shown in Fig. 3. These curved upwardly extending bucket portions are located upon opposite sides of a central partition 82' which is arranged between the side frame portions and over the cross strips 78 for guiding the corn along the husking rolls 82. These are arranged beneath the upper lap of the conveyer or elevator mechanism above described and at the same incline with the tracks 75, with narrow spaces between said rolls for permitting the husks and refuse material or fodder and shelled corn to pass downward to the under side of the husking rolls into the inclined space 83 on the inside of the inclined chute shown in cross section in Fig. 3, and the side walls 84 of which are formed of heavy sheet metal. The bottom of said chute is formed of reticulated or perforated material in the form of a screen 85 secured to and supported by side wall portions 86 and having perforations or openings 87 therethrough adapted to permit the shelled corn to pass on downward into a bottom shelled-corn chute 88 having an imperforate bottom. The returning or downwardly moving lap of the conveyer or elevator comprising side chains 77 and bucket portions 80 passes along lengthwise of and beneath the husking rolls 82 at an incline on the inside of the space 83 between the side wall portions 84 of the chute and over the screen bottom 85 (see Figs. 2 and 3,) and carries with it the husks and fodder or refuse material, allowing the shelled corn to fall through the screen into the bottom of chute 88.

A shelled corn conveyer comprising a sprocket chain 89 shown in Figs. 2 and 3, and transverse blades or buckets 90 secured to and carried by said chain, extends from end to end of the bottom chute 88 and screen 85, and has its upper lap above said screen and adapted to move downward along the upper side of the screen with or between the bucket portions 80 and 81 of the upper conveyer or elevator as the latter moves downward over said screen and beneath the husking rolls. The lower lap of the shelled corn elevator is beneath the screen 85, as shown in Fig. 3, and is adapted to move upward at an incline beneath said screen and inside of the bottom chute 88, so as to carry the shelled corn upward to the upper open end of said bottom chute and deliver it into the discharge elevator or receptacle 76. The screen-bottomed chute for discharging the husks and which provides the space 83 directly beneath the inclined husking rolls is open at the bottom forward end and is thus adapted to discharge the husks upon the ground as they are carried downward by the lower lap of the top elevator or conveyer cross-pieces or buckets.

The top elevator is supported at its lower end by idler sprocket wheels 91 mounted upon a shaft 92 which is journaled in suitable bearings in the frame, as indicated in Fig. 2, said idlers being in supporting engagements with the chains 77 of said upper conveyer or elevator. The upper portion of said conveyer or elevator is supported at the upper end of the tracks 75 upon sprockets 93 which are fixed to a shaft 94, which is journaled in suitable adjustable bearings 95 and provided with an outer sprocket wheel 96 on said shaft and operatively connected with a sprocket wheel 97 on the driving shaft 27 by means of a sprocket chain 98 which is in engagement with the toothed peripheries of said sprockets 96 and 97.

The bottom endless conveyer or shelled corn elevator is supported at its lower end by an idler sprocket wheel 99 upon a stub shaft 100 which is supported by the bottom end of the screen 85, said idler 99 being in engagement with the endless chain 89 of said shelled corn elevator or conveyer. The upper end of the shelled corn conveyer or elevator is supported by a central sprocket wheel 102 fixed to a shaft 103 which is journaled in suitable bearings in the upper portion of the elevator frame. The shaft 103 is provided with an outer sprocket wheel 104 fixed thereto and in toothed engagement with the chain 98 already described, and thereby operatively connected with the driving shaft 27 through the medium of the sprocket 97 already described.

The husking rolls are journaled at their upper ends in suitable bearings in a cross piece 105 shown in Fig. 1, which cross piece is secured to and supported at its opposite ends by the frame members 73 and 74 which are shown in Fig. 3. The lower ends of the husking rolls are supported in a similar manner by a similar or identical cross piece (not shown). The two inner husking rolls are provided with laterally projecting pins or studs 106 which are adapted to enter corresponding openings 107 in the adjacent outer husking rolls, as shown in Fig. 3. Each of the husking rolls is provided at its upper end with a spur pinion 108, as shown in Fig. 1, the pinions on the inner husking rolls being out of engagement with each other but in toothed engagement with the pinion of the adjacent outer roll, and each outer roll is also provided with a bevel pinion 109 fixed thereto above its spur pinion and in toothed engagement with a similar bevel pinion 110 mounted upon and in fixed relation to a shaft 111—there being two of said pinions 110, one for each pinion 109. The shaft 111 is provided with a sprocket wheel 112 fixed to its outer end, and is operatively connected with the driving shaft 27 already described, by means of a sprocket wheel 113 on said shaft 27, and a sprocket chain 114 upon and forming a connection between said sprocket wheels 112 and 113. The shaft and gear mechanism at the top of the husking rolls and the upper ends of said rolls are covered by a shield plate 110', and the bottom ends of said rolls are covered by a similar shield plate forming the bottom of the lower end of the conveyer, and covering the bottom bearings and husking roll supports.

The sprocket wheel 113 is provided with a clutch member 114' fixed thereto, and a movable clutch member 115 is slidably mounted upon and rotatable with the shaft 27 by means of a spline, and provided with an operating arm or lever 116 pivotally mounted on the frame and operatively connected with a hand lever 117 by means of a bell crank lever 118 one end of which is connected with the arm 116, and the opposite arm of which is connected with the rear end of a connecting rod 119, the forward end of said rod being connected with said hand lever 117. The movable clutch member 115 is operated in one direction by means of said lever, and is adapted to be operated in the opposite direction by said lever or any suitable ordinary or known means for operating clutches. The levers 42 and 117 are each provided with a segment 121 and 120 respectively, as shown in Fig. 1, and with a pawl for each lever adapted to engage the segments and hold the levers in different adjusted positions.

The discharge elevator 76 may be of any desired, or ordinary form, having a boot or casing 122 which is by preference hopper-shaped at the bottom and adapted to receive corn dropped therein from the conveyers already described. The conveyer chain 123 of the discharge elevator 76 is provided with transverse blades or buckets 124 secured thereto at suitable intervals, and said chain is driven by means of a sprocket wheel 125 on a shaft 126 which is journaled in a suitable bearing or bearings 127 and operatively connected with the driving shaft 27 by bevel gear mechanism (not shown) which gear mechanism may be of any ordinary or desired form.

A caster-wheel beam 128 is scured at its rear end to the axle of the machine and extends through a vertical opening in a guide 129 which is secured to the forward end of the main frame, and is provided, at its forward end, with a caster wheel 130 mounted between the forked arms of a curved fork 131 secured to the bottom of or forming an integral forked part of an upright spindle 132 which is journaled in bearings or castings 133 and 134 bolted to said beam. A hand lever 135 pivotally mounted upon the caster-wheel beam is provided with an upwardly and downwardly movable lever arm 136 connected with the forward portion of the frame by means of a connecting link 137, the lower end of which link is secured to the main frame by means of a lug 138 as indicated in Fig. 2. A toothed segment 139 is mounted adjacent to the lever 135, and said lever is adapted to be operatively connected with said segment and to be held in any position to which said lever may be adjusted. The main frame of the machine may thus be tilted to any desired incline by raising or lowering the front end of the frame through the medium of the lever 135. A draw rod 142 is secured at its rear end to the axle of the machine and is provided with a clevis or link 143 at its forward end for connecting the double-trees or other device for pulling the machine. A tongue 144 is connected with the main frame by means of eyes 145 secured to the main frame, eyes 146 secured to the tongue and a shaft 147 extending through all of said eyes and through the end of a brace 148, which is also secured at its forward end to the tongue. The driver's seat (not shown) is mounted upon the caster-wheel beam to which it is secured by means of a suitable support 149 in position to enable the driver or operator to readily reach the hand levers above described.

Springs 150 mounted upon one or more braces 151 are arranged at suitable intervals in the elevator frame or casing and above the husking rolls in position to press the ears of corn down upon the husking rolls and permit but yieldingly resist the upward movement of the ears as they are fed upward and rearward over the husking rolls.

We claim:

1. In a machine of the class described, the combination of a frame, feeding rolls journaled in the frame and adapted to admit stalks therebetween, a rotary beater journaled in front of one of said rolls, and an intermediate rotary beater mounted between said rotary beater and one of said feeding rolls.

2. In a machine of the class described, the combination of a frame, feeding rolls journaled in the frame and adapted to admit stalks therebetween, a forward rotary beater mounted forward of said rolls, an intermediate rotary beater mounted between said forward rotary beater and one of said feeding rolls, and means for rotating the rotary beaters and feeding rolls.

3. In a machine of the class described, the combination of a frame provided with a longitudinal passage, feeding rolls journaled on opposite sides of said passage, a rotary beater mounted forward of said rolls adjacent to said passage, an intermediate rotary beater mounted between said rotary beater and one of the feeding rolls, means for rotating both of said rotary beaters in the same direction, and means for rotating the feeding rolls.

4. In a machine of the class described, the combination of a portable frame provided with a longitudinal passage, feeding rolls journaled on opposite sides of said passage, a rotary beater mounted forward of said rolls and adjacent to said passage, an intermediate rotary beater mounted between said rotary beater and one of the feeding rolls, means for rotating both of the rotary beaters, and a conveyer adjacent to one side of said feeding rolls and rotary beater mechanism.

5. In a machine of the class described, the combination of a portable frame provided with a longitudinal passage, upwardly and rearwardly inclined feeding rolls journaled on opposite sides of said passage, a rotary beater mounted adjacent to said passage forward of and extending over one of said feeding rolls, an intermediate rotary beater mounted between said rotary beater and the last mentioned feeding roll, means for rotating said rotary beater mechanism, and means for rotating the feeding rolls.

6. In a machine of the class described, the combination of a portable frame provided with a longitudinal passage, upwardly and rearwardly inclined feeding rolls journaled on opposite sides of and extending over said passage, and upwardly and rearwardly inclined rotary beater mounted forward with respect to and extending over a portion of one of said feeding rolls and adapted to rotate in a direction opposite to the direction of rotation of the latter, a second rotary beater mounted rearward with respect to and extending upward and rearward at an incline adjacent to the first mentioned rotary beater, means for rotating both of said rotary beaters in the same direction, and means for rotating the feeding rolls.

7. In a machine of the class described, the combination of a portable frame provided with a longitudinal passage, upwardly and rearwardly inclined feeding rolls journaled on opposite sides of said passage, an inclined shield extending over one of said feeding rolls on one side of the pasage, an upwardly and rearwardly inclined rotary beater mounted forward with respect to and extending over a portion of the other feeding roll and on the opposite side of the passage from said shield, a second rotary beater extending upward and rearward at an incline back of and below the first mentioned rotary beater, means for rotating both of said rotary beaters in a direction opposite to the direction of rotation of the feeding roll on the same side of the passage and adjacent to which said beater mechanism is located, means for rotating the feeding rolls, and a conveyer mounted adjacent to the shielded feeding roll and on the opposite side of the passage from the rotary beaters.

8. In a machine of the class described, the combination of a portable frame provided with a longitudinal passage, a pair of main feed rolls on opposite sides of the passage, bottom rolls journaled on opposite sides of the passage and each extending forward and at an angle with respect to the main feed roll on the corresponding side of the passage and adapted to rotate in a direction opposite to the direction of rotation of the latter, rotary beater mechanism located forward of and extending over the lower portion of one of the main feed rolls, means for rotating the rotary beater in a direction opposite to the direction of rotation of the main feed roll adjacent to which such rotary beater is mounted, and means for rotating the main feed rolls in opposite directions.

9. In a machine of the class described, the combination of a portable frame provided with a longitudinal passage, a pair of main feed rolls extending upward and rearward at an incline on opposite sides of the passage, ribbed bottom rolls journaled on opposite sides of the passage and each extending forward at an angle with respect to a main feed roll, a shield extending over one of the main feed rolls on one side of the passage, a rotary beater journaled on the opposite side of the pasage from said shield and extending upward and rearward at an incline in front of one of the main feed rolls, and means for rotating said rotary beater and all of said rolls.

10. In a machine of the class described, the combination of a portable frame provided with a longitudinal passage, a pair of main feed rolls extending upward and rearward at an incline on opposite sides of the passage, ribbed bottom rolls journaled on opposite sides of the passage and each extending forward at an angle with respect to and connected with the lower end of a main feed roll, rotary beater mechanism mounted on one side of the passage in front of and extending upward and rearward at an incline adjacent to one of the main feed rolls, means for rotating the rotary beater mechanism in a direction opposite to the direction of rotation of the feeding roll in front of which the rotary beater mechanism is located, and means for rotating the main feed rolls and thereby the ribbed bottom rolls.

11. In a machine of the class described, the combination of a portable frame provided with a longitudinal passage, a pair of main feed rolls extending upward and rearward at an incline on opposite sides of the passage, ribbed bottom rolls journaled on opposite sides of the passage and each extending forward of and at an angle with respect to the lower portion of a main feed roll, a pair of rotary beaters mounted on one side of the passage and extending upward in front of one of the main feed rolls, a conveyer on the opposite side of the main feed rolls and passage from the rotary beaters, means for rotating the rotary beaters, means for rotating the main feed rolls, and means for operating the conveyer.

12. In a machine of the class described, the combination of a portable frame provided with a longitudinal passage, a pair of feed rolls extending upward and rearward at an incline on opposite sides of the passage, a worm rotatably mounted and extending upward and rearward at an incline in front of one of said feed rolls, a plurality of rotary beaters extending upward and rearward at an incline between said worm and the feed roll in front of which the worm is mounted, means for rotating both of said rotary beaters, means for rotating the worm, and means for rotating the feed rolls.

13. In a machine of the class described, the combination of a portable frame provided with a longitudinal passage, a pair of feed rolls extending upward at an incline on opposite sides of the passage, a pair of worms rotatably mounted on opposite sides of the passage and each extending rearward in front of the lower portion of one of said feed rolls, rotary beater mechanism journaled on one side of the passage between one of said worms and a feed roll, and means for rotating the worms, the rotary beater mechanism and the feed rolls.

14. In a machine of the class described, the combination of a portable frame provided with a longitudinal passage, a pair of feed rolls extending upward and rearward at an incline on opposite sides of the passage, a worm rotatably mounted adjacent to the passage and extending upward and rearward in front of one of the feed rolls, a rotary beater mounted between said worm and the inclined feed roll in front of which the worm is located, a conveyer on the opposite side of the passage from said rotary beater, means for rotating the worm, the rotary beater, and the feed rolls, and means for operating the conveyer.

15. In a machine of the class described, the combination of a portable frame provided with a longitudinal passage, a pair of feed rolls journaled on opposite sides of the passage and extending upward and rearward at an incline, a worm rotatably mounted adjacent to the passage and extending upward and rearward at an incline in front of one of the feed rolls, a rotary beater mounted between the worm and the feed roll in front of which the worm is located, a shield extending over the feed roll on the opposite side of the passage from said rotary beater, means for rotating the worm, the rotary beater and the feed rolls, and a receptacle adjacent to the shield, for receiving material from the rotary beater.

16. In a machine of the class described, the combination of a portable frame provided with a longitudinal passage, a pair of main feed rolls extending upward and rearward at an incline on opposite sides of said passage, ribbed bottom rolls journaled on opposite sides of the passage and each extending forward at an angle with respect to and operatively connected with a main feed roll, worm mechanism mounted forward of the main feed rolls and extending upward and rearward at an incline, a rotary beater mounted on one side of the passage between the worm mechanism and one of the main feed rolls, a conveyer on the opposite side of the passage from the rotary beater, means for rotating the worm mechanism, the rotary beater and the main feed rolls and ribbed bottom rolls, and means for operating the conveyer.

17. In a machine of the class described, the combination of a portable frame provided with a longitudinal passage, a pair of feed rolls extending upward and rearward at an incline on opposite sides of the passage, ribbed bottom rolls journaled on opposite sides of the passage and each extending forward at an angle with respect to a main feed roll, inclined feeding mechanism mounted on opposite sides of the passage and extending upward and rearward at an incline over the ribbed bottom rolls and in front of the main inclined feed rolls, rotary beater mechanism mounted on one side of the passage between said front inclined feeding mechanism and a main inclined feed roll, a conveyer on the side of the passage opposite to the rotary beater mechanism, means for operating the main feed rolls, ribbed bottom rolls, rotary beater mechanism and front inclined feeding mechanism, and means for operating the conveyer.

18. In a machine of the class described, the combination of a main frame provided with a longitudinal passage, a pair of main feed rolls extending upward and rearward at an incline on opposite sides of said passage, ribbed bottom rolls journaled on opposite sides of the passage and each extending forward at an angle with respect to a main feed roll, inclined worms mounted forward of the main feed rolls and extending upward and rearward over the ribbed bottom rolls, rotary beater mechanism mounted on one side of the passage between the worm mechanism and one of the main feed rolls, a conveyer on the opposite side of the passage from the rotary beater mechanism, traction wheel mechanism on which the main frame is supported, and means for operatively connecting the worms, the rotary beater mechanism, all of said rolls, and the conveyer with the traction wheel mechanism.

19. In a machine of the class described, the combination of a frame, feeding rolls journaled in the frame and adapted to admit stalks therebetween, a plurality of rotary beaters journaled in front of and adapted to rotate in a direction opposite to the direction of rotation of one of said feed rolls, and having lateral interlapping beater blades, and means for operating said feed rolls and rotary beaters.

20. In a machine of the class described, the combination of a frame provided with a longitudinal passage, feeding rolls journaled in the frame on opposite sides of the passage and adapted to admit stalks therebetween, a plurality of rotary beaters journaled in front of and adapted to rotate in a direction opposite to the direction of rotation of one of said feed rolls, and having lateral overlapping beater blades adapted to extend into said passage, a conveyer located on the opposite side of the passage from the rotary beaters and adapted to receive ears of corn from the latter, and means for operating the feed rolls, rotary beaters and conveyer.

21. In a machine of the class described, the combination of a frame provided with a longitudinal passage, feed rolls journaled in the frame on opposite sides of the passage, a plurality of rotary beaters journaled in front of one of said feed rolls and adapted to rotate in a direction opposite to the direction of rotation of said feed roll, and having lateral overlapping beater blades, upwardly and rearwardly inclined worm mechanism located forward of the rotary beater mechanism and feed rolls, a receptacle located on the opposite side of the passage from the rotary beaters, and means for operating the feed rolls, rotary beater mechanism and worm mechanism.

22. In a machine of the class described, the combination of a frame provided with a longitudinal passage, main feed rolls journaled in the frame and extending upward and rearward at an incline on opposite sides of the passage, bottom rolls journaled on opposite sides of the passage and each extending forward at an angle with respect to the main feed rolls, a pair of worms located on opposite sides of the passage and extending upward and rearward at an incline over the bottom rolls and toward the main feed rolls, and means for operating the main feed rolls, bottom rolls and worms.

23. In a machine of the class described, the combination of a frame provided with a longitudinal passage, main feed rolls journaled in the frame and extending upward and rearward at an incline on opposite sides of the passage, ribbed bottom rolls journaled on opposite sides of the passage each extending forward at an angle with respect to one of the main feed rolls, means for rotating each bottom roll in a direction opposite to the direction of rotation of the main feed roll in front of which such bottom roll is mounted, rotary beater mechanism located in front of and extending upward and rearward at an incline adjacent to one of the main feed rolls, upwardly and rearwardly inclined worm mechanism located forward of the rotary beater mechanism and main feed rolls, and means for operating the main feed rolls, the rotary beater mechanism, and the worm mechanism.

24. In a machine of the class described, the combination of a frame provided with a longitudinal passage, main feed rolls journaled in the frame and extending upward and rearward at an incline on opposite sides of the passage, ribbed bottom rolls journaled on opposite sides of the passage and each operatively connected with and rotatable in an opposite direction with respect to a main feed roll, rotary beater mechanism located adjacent to one side of the passage and extending upward and rearward in front of one of the main feed rolls, worm mechanism located forward of the rotary beater mechanism and extending over the ribbed bottom rolls at an incline, a traction wheel, a main driving shaft operatively connected with the traction wheel, a counter shaft operatively connected with the main driving shaft, and means for operatively connecting the worm mechanism, rotary beater mechanism, and main feed rolls with the counter shaft.

25. In a machine of the class described, the combination of a frame provided with a longitudinal passage, a pair of inclined feed rolls journaled on opposite sides of the passage, means for rotating said feed rolls in opposite directions, a rotary beater journaled in front of and adapted to rotate in a direction opposite to the direction of rotation of one of said feed rolls and having beater blades adapted to extend over said passage, a second rotary beater journaled adjacent to and having radial beater blades in position to overlap the blades of the first mentioned beater and rotatable in the same direction, means for operating said rotary beaters, and a receptacle located on the opposite side of the passage from the rotary beaters, for receiving material operated upon by the beaters.

FRED H. ROLLINS.
MASSENA H. SNOW.

Witnesses:
DAVID H. FLETCHER,
JENNIE L. FISKE.